United States Patent
Ruzic et al.

(10) Patent No.: US 6,215,978 B1
(45) Date of Patent: Apr. 10, 2001

(54) POSITION-SENSITIVE EDUCATIONAL PRODUCT

(75) Inventors: Steven Lee Ruzic; Patrick Rome, both of Dallas; Larry Dale Thomas, Jr., Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 07/759,192

(22) Filed: Sep. 10, 1991

Related U.S. Application Data

(63) Continuation of application No. 07/309,451, filed on Feb. 10, 1989, now abandoned.

(51) Int. Cl.$^7$ ........................................... G09B 5/04
(52) U.S. Cl. ..................... 434/311; 434/159; 434/308; 446/397; 273/153 R; 273/454; 340/689; 340/692
(58) Field of Search .................... 434/176, 308, 434/327, 335, 337, 343, 345, 365, 393, 397, 402, 403, 428, 429, 485, 311.159; 273/85 G, 153 R, 85 E, 299, 301, 302, 440, 454, 445–448, 456, 138 A, 146; 84/476; 340/686, 689, 692; 446/397; 40/442

(56) References Cited

U.S. PATENT DOCUMENTS

| | | |
|---|---|---|
| 1,465,637 | * 8/1923 | Goss ........................................ 434/403 |
| 4,318,245 | 3/1982 | Stowell et al. . |
| 4,337,375 | 6/1982 | Freeman .............................. 179/1 SA |
| 4,337,948 | * 7/1982 | Breslors et al. ................... 273/1 GC |
| 4,403,965 | 9/1983 | Hawkins ................................ 434/327 |
| 4,575,087 | * 3/1986 | Sinclair ............................ 273/153 R |
| 4,662,260 | 5/1987 | Rumsey ................................ 84/1.01 |
| 4,673,357 | * 6/1987 | Ito ..................................... 434/335 X |
| 4,701,146 | * 10/1987 | Swenson ........................ 273/58 G X |
| 4,729,564 | * 3/1988 | Kuna et al. ........................... 434/335 |
| 4,809,979 | * 3/1989 | Skowronski et al. ............. 273/153 R |
| 4,836,075 | 6/1989 | Armstrong ............................ 84/1.01 |
| 4,936,780 | * 6/1990 | Cogliano .......................... 446/397 X |
| 4,957,291 | * 9/1990 | Miffitt et al. ...................... 273/153 R |
| 4,961,579 | * 10/1990 | Thompson et al. ............. 434/169 X |
| 4,973,052 | * 11/1990 | Conti ................................. 273/1 GC |

* cited by examiner

Primary Examiner—Joe H. Cheng
(74) Attorney, Agent, or Firm—Bret J. Petersen; Frederick J. Telecky, Jr.

(57) ABSTRACT

An educational toy (10) having a dodecahedron shape is formed with a different visual display on each planar face (17–28). A position sensing mechanism (50) is oriented inside the toy (10) to inform a microprocessor (62) which one of the planar faces (17–28) is in the "up" position. As the toy (10) is turned or moved a signal is generated to "power on" and a musical tune is played. When one of the planar faces (17–28) is stopped in the "up" position, the position sensing mechanism (50) informs the microprocessor (62) and an aural response corresponding to the visual display is transmitted through a speaker (44). If the toy (10) is left alone for a specified period of time, a warning tune is transmitted. If the toy (10) is still not moved thereafter, the toy (10) will automatically "power off".

42 Claims, 4 Drawing Sheets

POSITION-SENSITIVE EDUCATIONAL PRODUCT

This application is a continuation of application Ser. No. 309,451, filed Feb. 10, 1989, now abandoned.

BACKGROUND OF THE INVENTION

Voice and sound synthesizing devices have been long used in toys. Such toys are capable of providing sounds responsive to positions in, for example, a doll or a ball. These toys, however, are of little or no educational value to the user.

One such toy, for example, comprises a doll as disclosed in U.S. Pat. No. 4,318,245, issued Mar. 9, 1982, to Stowell et al. The doll as disclosed by Stowell et al. produces a variety of sounds responsive to positioning of the doll by a child. The doll is able to make a specific number of sounds, such as laughter and crying, but is not capable of providing educational assistance to an infant or child.

Another sound-producing device is disclosed in U.S. Pat. No. 4,662,260 issued, May 5, 1987, to Rumsey. The Rumsey patent discloses a ball that is capable of producing different notes responsive to positioning of the ball. A person using the ball is capable of producing a musical tune by positioning the ball in various locations to sequence the appropriate notes. The Rumsey device provides no direct instruction to the user and does not serve as a learning aid.

Thus, there is a need for a combined toy and learning aid which is capable of educating infants through adults in various visual displays matched with their sound and/or an oral identification in a position-sensitive educational format.

SUMMARY OF THE INVENTION

The present invention disclosed herein comprises a didactic device in the form of a position-sensitive educational product. The present invention helps the user to associate visual images with specific sounds and/or their identification.

In accordance with one aspect of the invention, a multi-sided container forms the exterior shape of a toy. Within the container is a power source such as a battery and a microprocessor capable of synthesizing sounds and/or voice. The position sensor indicates to the microprocessor which side of the toy is in the "up" position, and the microprocessor provides sound responsive to a visual display on the "up" position.

In a preferred embodiment, the container comprises a dodecahedron, and the position sensor comprises five reed switches. The five reed switches combine to provide a code to the microprocessor to indicate the correct sound to be reproduced corresponding to the "up" position.

It is a technical advantage of the present invention that a toy is provided which can educate infants through adults. The toy can be positioned so that variety of visual displays can be identified by an aural response. The toy is adaptable to a-variety of visual displays that can be keyed to the level of development of a child or young adult.

BRIEF DESCRIPTION OF THE DRAWINGS

For a more complete understanding of the present invention and for further advantages thereof, reference is now made to the following Detailed Description, taken in conjunction with the accompanying Drawings, in which.

DETAILED DESCRIPTION OF THE INVENTION

Figure 1:
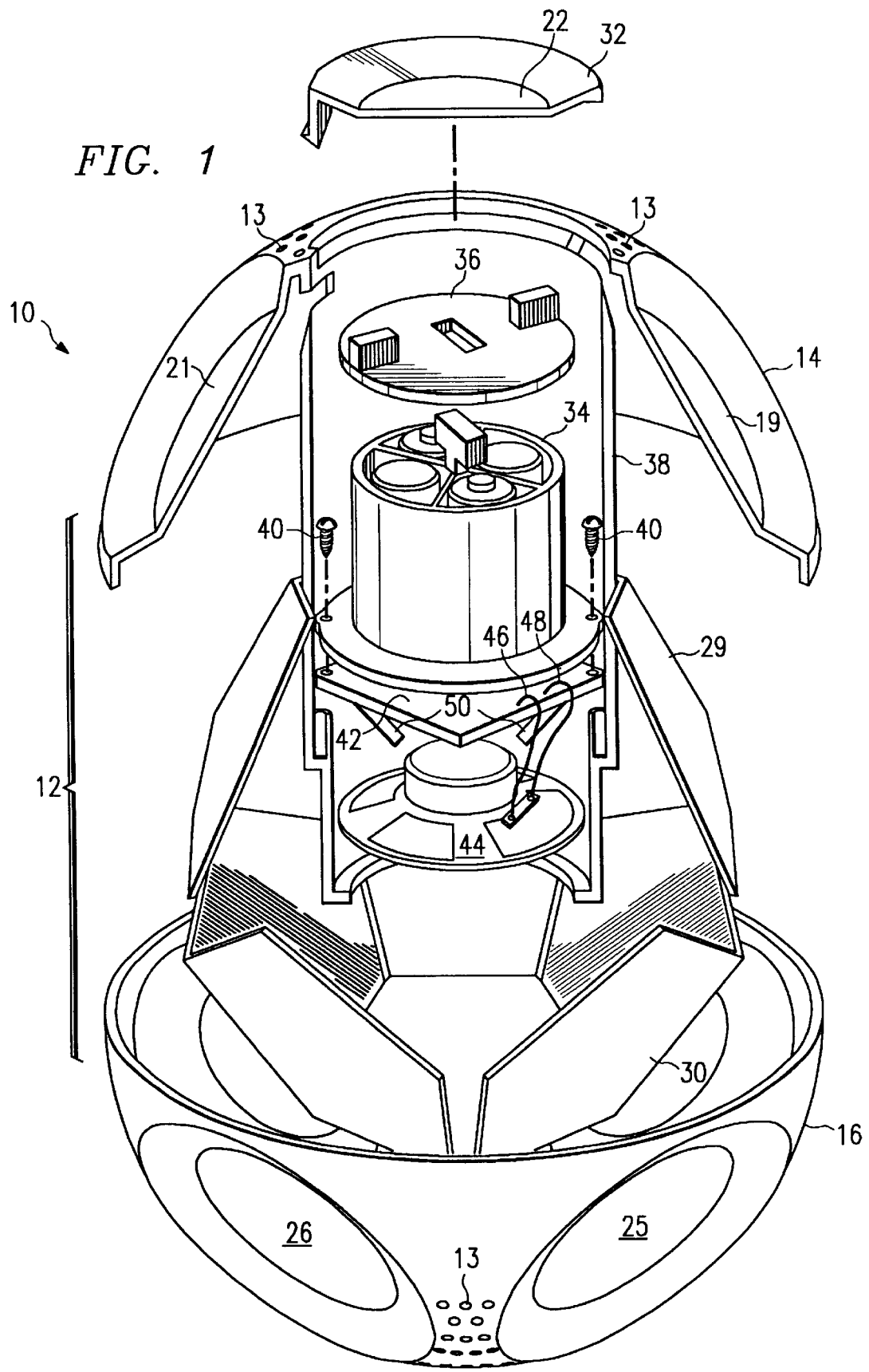
FIG. 1 is an exploded perspective view of a preferred embodiment of the present invention.

In FIGURES the drawings, like items are identified by like and corresponding numerals for ease of reference. Referring to FIG. 1, an exploded perspective view of a toy constructed in accordance with the present invention is generally identified by the reference numeral 10. The toy 10 comprises a container 12, having first and second halves 14 and 16. The container 12 preferably comprises a twelve sided polygon or a dodecahedron having twelve planar faces 17–28 (only 19, 21, 22, 25 and 26 are shown in FIG. 1). The planar faces 17–28 are provided with a visual display which corresponds with a sound and/or a voice produced by a microprocessor, as will subsequently be described in greater detail.

For example, the toy 10 is provided with a first and second insert 29 and 30, which may have, for example, animal displays (not shown) on each of the planar faces 17–28. The inserts 29 and 30 make it relatively simple to replace the visual displays and still use the same container 12. Alternatively, it is possible to provide visual displays that are connected directly to a surface of the planar faces 17–28.

The container 12 is constructed with a plastic material that is nontoxic and is safe for the use of infants. The first and second halves 14 and 16 are molded to have smooth or rounded rather than sharp edges to facilitate rolling of the toy 10 onto its various planar faces 17–28. The first and second halves 14 and 16 may be secured together by any appropriate method such as sonic welding, gluing or fastening with screws. The first and second halves 14 and 16 are provided with a plurality of apertures 13 to facilitate the transmission of sound therethrough.

Access to the interior of the container 12 is through a removable cap 32 which is coincident with face 22 and is preferably constructed to deny access except by prying with a screwdriver or a coin. Within the container 12 is a battery pack 34, which may contain, for example, four AA batteries, to provide power for the toy 10. A cover 36 may be provided for the battery pack 34 to allow for an on-off switch. The battery pack 34 is secured to an inner support 38 by any appropriate method, such as screws 40.

Secured to the inner support 38 adjacent the battery pack 34 is a printed circuit (PC) board 42, which contains circuitry and a microprocessor necessary to enable the toy 10 to function, as will be subsequently described in greater detail. Opposite the removable cap 32 and within the container 12 is a speaker 44. The speaker 44 is interconnected to the PC board 42 via electrical connections 46 and 48, which enable the speaker 44 to respond to the microprocessor. A position sensing mechanism 50 (FIGS. 3a and 3b) is interconnected to the PC board 42 to allow the microprocessor to know which of the planar faces 17–28 of the toy 10 is in a predetermined orientation or the "up" position (face 22 in FIG. 1) in which one of the faces 17–28 is uppermost.

In operation, when the toy 10 is moved, it immediately turns on and begins playing musical notes while being rolled or turned. If a child stops-turning or rolling the ball, a pleasant voice will announce the identification of and a sound corresponding to the visual display on the planar face 17–28 which is in the "up" position. For example, using the following visual display arrangement:

| | |
|---|---|
| face 17 = a dog; | face 23 = a horse: |
| face 18 = a cat; | face 24 = an owl; |
| face 19 = a duck; | face 25 = a sheep; |
| face 20 = a cow; | face 26 = a frog; |
| face 21 = a goose; | face 27 = a chicken; and |
| face 22 = a pig; | face 28 = a bird; |

If face 19 having a duck picture is in the "up" position, the toy 10 will state that a duck is shown followed by a representative sound of a duck. Continuing the example, if face 22 having a pig picture is turned to the "up" position, the toy 10 will state that a pig is shown followed by a representative sound of a pig, and so on.

When the toy 10 is moved again, musical notes play until another visual display is recognized in. the "up" position by a pause in motion. As long as the toy 10 is rolled or turned, it will continue to respond with an identification and representative sound of the visual display in the "up" position. When the toy is not turned or rolled for a brief period, a short musical signal will play to reattract the child's attention. If there is no further activity, the toy 10 will announce that it is being turned off, which will then automatically occur.

Figure 2:
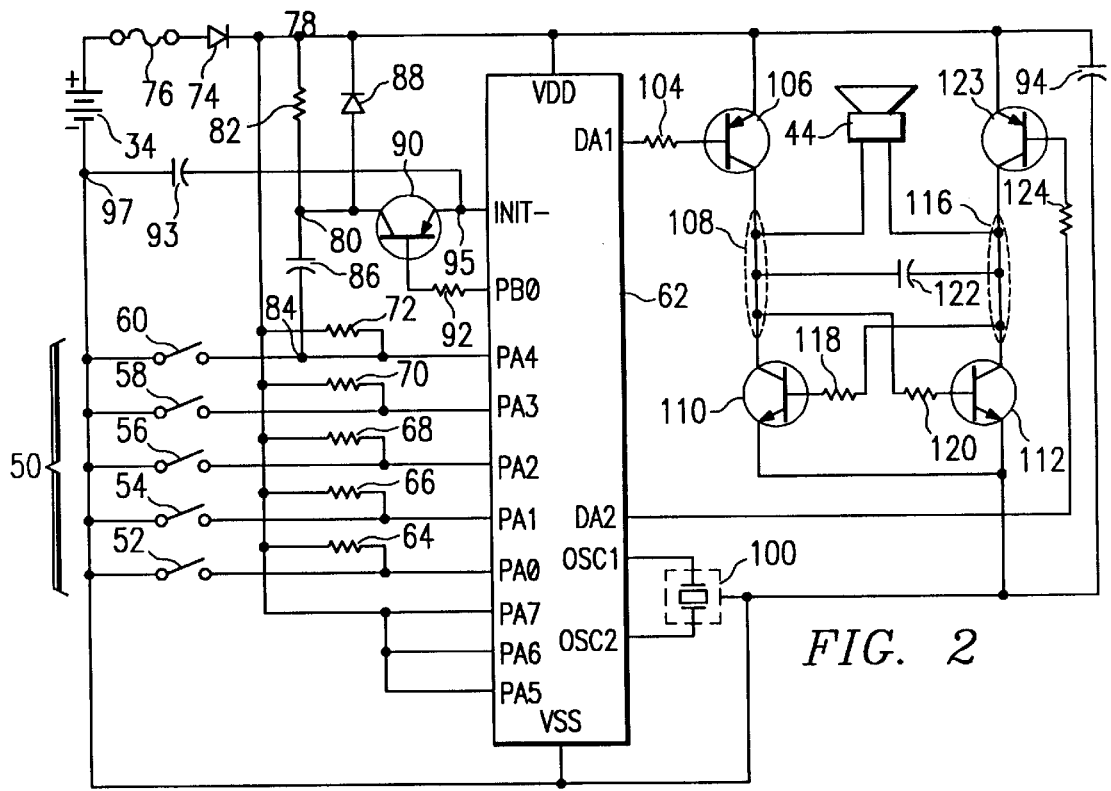
FIG. 2 is an electrical schematic view illustrating a circuit and a microprocessor used to produce an audible response to a position indication.

Referring to FIG. 2, an electrical schematic illustrating the circuit and microprocessor used to convert the output of the position sensing mechanism 50 into an aural response through the speaker 44 is illustrated. As shown in FIG. 2, the position sensing mechanism 50 corresponds to five switches 52, 54, 56, 58 and 60. The switches 52–60 correspond to five planes of a dodecahedron, as will be subsequently described in greater detail.

A microprocessor 62 is connected to switches 52–60 by pins PA0, PA1, PA2, PA3 and PA4, respectively. The other contacts of each switch are connected to node 97. The microprocessor 62 is capable of decoding at least twelve lines of encoded data, storing multiple sounds, selecting one of the stored sounds corresponding to a decoded signal and generating an audible sound in response to the decoded signal. The audible sound is preferably of an educational nature corresponding to a visual display on the planar faces 17–28 (FIG. 1).

Pull-up resistors 64, 66, 68, 70 and 72 are connected to pins PA0–PA4 and switches 52–60, respectively. Resistors 64–72 may be on the order of 200 K ohms and are also connected to the cathode of a diode 74. The anode of diode 74 is connected to a fuse 76, which is connected to the battery pack 34, which provides, for example, six volts. The fuse 76 protects the circuit from shorts and the diode 74 prevents reverse battery damage.

Between node 78 and node 80 is a resistor 82 which may be on the order of 200 K ohms. Between node 80 and node 84 is a capacitor 86, which may be on the order of 12,000 picofarads. The node 80 is connected to the anode of a diode 88 with the cathode of diode 88 connected to the node 78. The collector of a transistor 90 which may be of the pnp type is also connected to the anode of the diode 88. The emitter of the transistor 90 is connected to the microprocessor 62 at inverse INIT. The base of the transistor 90 is connected through a resistor 92, which may be on the order of 82 K ohms, to the microprocessor 62 at PB0. A capacitor 93 which may be on the order of 2200 picofarads is connected between a node 95 and a node 97.

The microprocessor 62 is powered by the battery pack 34 through VDD and VSS. A capacitor 94 which may be on the order of forty-seven picofarads is installed between node 78 and the node 97. A ceramic resonator 100 provides a clock to run the microprocessor 62 through OSC1 and OSC2. Pins PA5–PA7 of the microprocessor 62 are all coupled together and connected to the cathode of diode 74.

Speech output is transmitted to the speaker 44 through pins DA1 and DA2. Pin DA1 is connected through a resistor 104 which may be on the order of 560 ohms to the base of transistor 106 which may be of the pnp type. The emitter of the transistor 106 is connected to node 78, while the collector of the transistor 106 is connected to a node 108. The collector of a transistor 110 which may be of the npn type is connected to node 108. The emitter of the transistor 110 is connected to the emitter of a transistor 112 also of the npn type and to node 97. The base of transistor 110 is connected to a node 116 through a resistor 118, which may be on the order of 100 ohms. The collector of transistor 112 is connected to the node 116 while the base of transistor 112 is connected to node 108 through a resistor 120, which may be on the order of 100 ohms.

Connected between nodes 108 and 116 is a capacitor 122, which may be on the order of 10 microfarads. Also connected between nodes 108 and 116 is the speaker 44 which is preferably on the order of 8 ohms. The emitter of a transistor 123 which may be of the pnp type is connected to node 78, while the collector of transistor 123 is connected to the node 116. The base of transistor 123 is connected to the output DA2 of microprocessor 62 through a resistor 124, which may be on the order of 560 ohms. The four transistors 106, 110, 112 and 123 form an amplifier for the speaker 44 and the capacitor 122 provides a filter.

In operation, when switch 60 is activated, the initialization circuit comprising the resistor 82, the capacitor 86, the diode 88, the transistor 90, the resistor 92 and the capacitor 93 activates the microprocessor 62 to play a musical tune. When the switch 60 goes from open to closed position, a negative voltage spike occurs through the capacitor 86. If the toy 10 is powered down, the negative spike will go through the transistor 90 and trigger the inverse INIT causing the microprocessor 62 to turn on. If the microprocessor 62 is already on, the transistor 90 will be off and the negative trigger will not reach the microprocessor 62. The capacitor 93 is present to prevent noise from causing an interrupt to the microprocessor 62. As various switches 52–60 are activated, the microprocessor 62 interprets the code provided thereto and transmits the appropriate aural response to the speaker 44. After a set period of time, when no switches 52–60 are activated, the circuit will automatically shut down after a warning.

It would also be possible to place a software option in the microprocessor to automate a quiet mode rather than a mechanical on/off switch. Such an option could provide a specific sequence of repositioning the toy (such as turning back-and-forth from a picture of an owl to a picture of a cow three times) to turn the toy off until the sequence is reversed (or another sequence is initiated). This would allow an adult to shut the toy off and leave it with a sleeping infant without fear of accidentally turning the toy on.

Figure 3B:
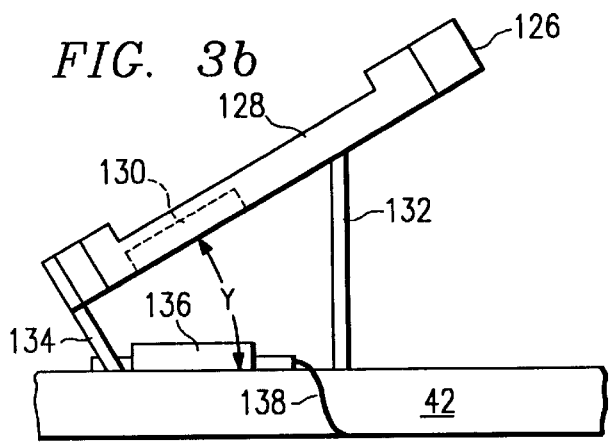
FIGS. 3a and 3b are views of a position sensing mechanism in accordance with the preferred embodiment of the present invention.
Figure 3A:
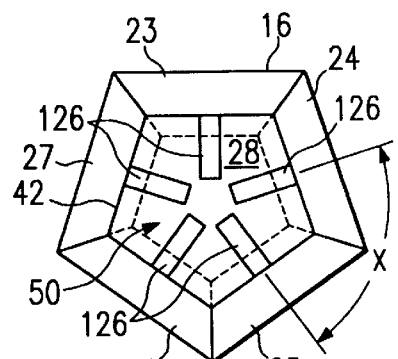

Referring to FIG. 3a, a top plan view of a position sensing mechanism constructed in accordance with the preferred embodiment of the present invention is generally identified by the numeral 50. As used herein, a position sensing mechanism means a device capable of being oriented by gravity with respect to the center of the earth. The sensing mechanism 50 comprises five slide tubes 126 mounted on the PC board 42. Proximate each slide tube 126 is a reed switch 136 (FIG. 3b) mounted on the PC board 42 which is mounted within the second half 16 of the container 12. Each slide tube 126 is arranged to be perpendicular to one of the planar faces 17–28 of the container 12, with adjacent slide tubes 126 being oriented 72 degrees apart, as indicated by angle X. In the example shown in FIG. 3a, the planar faces 23–27 each have a tube 126 perpendicular thereto.

Referring to FIG. 3b, a slide tube 126 is shown in cross-section. The slide tube 126 comprises a hollow tube 128 containing a magnet 130. The slide tube 126 is maintained at an approximate angle Y from the PC board 42. If the container 12 is a dodecahedron, the angle Y is preferably between twenty-three and twenty-seven degrees. The slide tube 126 is secured to the PC board 42 by any appropriate method, such as supports 132 and 134. Mounted below the hollow tube 128 is a reed switch 136 which is connected by any appropriate method, such as wire 138 to an electrical circuit as previously described above with reference to FIG. 2.

As the toy 10 is positioned on its various planar faces 17–28, the magnet 130 within the hollow tube 128 slides toward or away from the reed switch 136. When the magnet 130 is proximate the reed switch 136, a signal is sent through the wire 138 to the microprocessor 62 indicating a closed circuit. When the magnet 130 slides away from the reed switch 136, an open circuit response is provided to the microprocessor 62.

Since there are five switches, there is a possibility of 32 combinations of signals to be sent to the microprocessor 62 of which only twelve are active. If the toy 10 were designed to present visual displays of animals, a possible sequence of coded signals would be as follows:

| Switch No. | | | | | |
|---|---|---|---|---|---|
| 60 | 58 | 56 | 54 | 52 | 1 = Open<br>0 = Closed |
| 0 | 0 | 0 | 0 | 0 | Face 17 Dog |
| 0 | 0 | 0 | 0 | 1 | — |
| 0 | 0 | 0 | 1 | 0 | — |
| 0 | 0 | 0 | 1 | 1 | Face 21 Goose |
| 0 | 0 | 1 | 0 | 0 | — |
| 0 | 0 | 1 | 0 | 1 | — |
| 0 | 0 | 1 | 1 | 0 | Face 22 Pig |
| 0 | 0 | 1 | 1 | 1 | Face 24 Owl |
| 0 | 1 | 0 | 0 | 0 | — |
| 0 | 1 | 0 | 0 | 1 | — |
| 0 | 1 | 0 | 1 | 0 | — |
| 0 | 1 | 0 | 1 | 1 | — |
| 0 | 1 | 1 | 0 | 0 | Face 18 Cat |
| 0 | 1 | 1 | 0 | 1 | — |
| 0 | 1 | 1 | 1 | 0 | Face 23 Horse |
| 0 | 1 | 1 | 1 | 1 | — |
| 1 | 0 | 0 | 0 | 1 | — |
| 1 | 0 | 0 | 0 | 1 | Face 20 Cow |
| 1 | 0 | 0 | 1 | 0 | — |
| 1 | 0 | 0 | 1 | 1 | Face 25 Sheep |
| 1 | 0 | 1 | 0 | 0 | — |
| 1 | 0 | 1 | 0 | 1 | — |
| 1 | 0 | 1 | 1 | 0 | — |
| 1 | 0 | 1 | 1 | 1 | — |
| 1 | 1 | 0 | 0 | 0 | Face 19 Duck |
| 1 | 1 | 0 | 0 | 1 | Face 26 Frog |
| 1 | 1 | 0 | 1 | 0 | — |
| 1 | 1 | 0 | 1 | 1 | — |
| 1 | 1 | 1 | 0 | 0 | Face 27 Chicken |

-continued

| Switch No. | | | | | |
|---|---|---|---|---|---|
| 60 | 58 | 56 | 54 | 52 | 1 = Open<br>0 = Closed |
| 1 | 1 | 1 | 0 | 1 | — |
| 1 | 1 | 1 | 1 | 0 | — |
| 1 | 1 | 1 | 1 | 1 | Face 28 Bird |

Using the above decoding table, the microprocessor 62 will be able to determine which planar surface 17–28 is in the "up" position, and the correct aural response will be produced.

Figure 4:
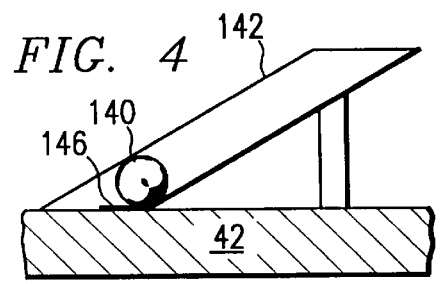
FIGS. 4–9, 10a, 10b, 11 and 12 are illustrations of alternative embodiments of position sensing mechanisms constructed in accordance with the present invention.

Alternatives to the reed switches may be used in the same configuration as shown in FIG. 3a. One such alternative is shown in FIG. 4, in which a conductive ball 140 rolls within a hollow tube 142. The hollow tube 142 may be either a metal conductor with a second contact on the PC board 42 or plastic with two contacts on the PC board 42. The contact 146 is interconnected to an electrical circuit and the microprocessor 62 as previously described above. Alternatively, the conductive ball 140 could comprise a conductive liquid such as mercury or sodium pottassium.

Figure 5:
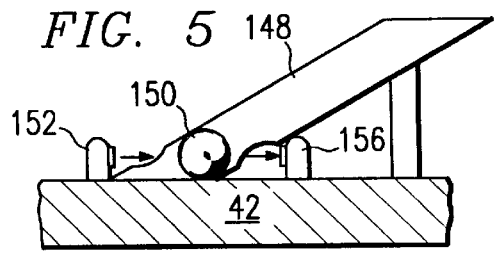

Another alternative to the reed switches is illustrated in FIG. 5. A hollow tube 148 has an opaque weight 150, which is free to move therein by gravity. The opaque weight 150 may comprise, for example, a ball bearing or an opaque liquid. A light transmitter 152 which may comprise on infrared light is positioned on the PC board 42 directly opposite a light detector 156 with the hollow tube 148 is between the transmitter 152 and the detector 156. The hollow tube 148 may either be formed from a clear material which will allow light from the transmitter 152 to pass therethrough, or provided with appropriate windows to allow passage of light therethrough. When the toy 10 is positioned so that the opaque weight 150 blocks the detector 156 from the transmitter 152, an open signal will be given to the microprocessor 62. When the tube 148 is oriented so that opaque weight 150 does not block the detector 156 from the transmitter 152, a closed signal will be transmitted to the microprocessor 62.

Figure 6:
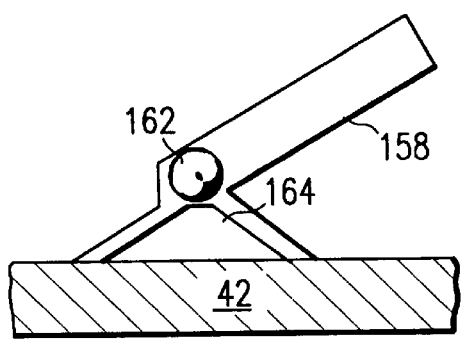

Referring to FIG. 6, another alternative to the reed switches of FIG. 3b is illustrated in cross-section. A hollow tube 158 is mounted on the PC board 42. Within the hollow tube 158 is a reflective weight 162, such as a chrome ball. Positioned within the tube 158 is a reflective optical switch 164. The switch 164 transmits a light beam into the tube 158, and if the reflective weight 162 is positioned proximate switch 164, the light will be reflected therefrom into the receiving portion of switch 164, providing a closed signal to the microprocessor 62. If the reflective weight 162 is positioned distally with respect to the switch 164, the light will not be reflected therefrom, and an open signal will be sent to the microprocessor 62.

Figure 7:
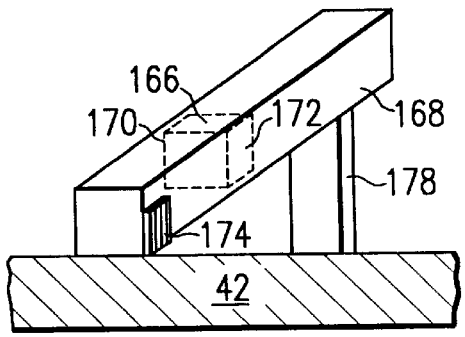

Referring to FIG. 7, another alternative to the reed switch of FIG. 3b is shown in perspective view. A magnet 166 is positioned within a track 168. The magnet 166 is positioned so that a north pole 170 and a south pole 172 are positioned on opposite sides of the track 168. Fixed to the track 168 is a magnetic sensor 174, such as a Hall-Effect sensor. The track 168 is fixed to the PC board 42 by a support 178. When the magnet 166 is proximate the sensor 174, the south pole 172 activates the sensor 174, indicating a closed position to the microprocessor 62. When the magnet 166 is distally positioned with respect to the sensor 174, the sensor 174 is turned off, sending an open signal to the microprocessor 62.

Figure 8:
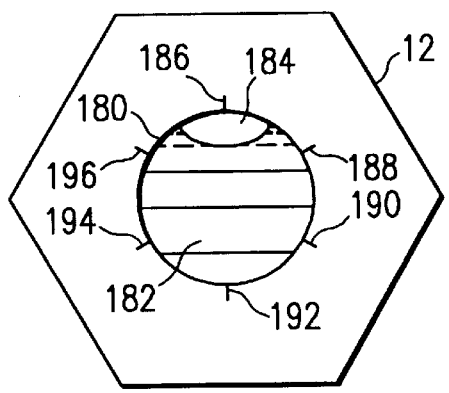

In an alternative embodiment, it would be possible to replace the five switches as shown above with reference to FIGS. 2–7 with one switch for each planar surface 17–28 of the toy 10. One embodiment for such an alternative is shown in cross-section in FIG. 8. The container 12 is fitted with an inner sphere 180 containing a conductive liquid 182. The sphere 180 is not completely filled with the liquid 182 and thus, an air bubble 184 is formed. Position-sensing contacts 186, 188, 190, 192, 194 and 196 are formed within the sphere 180 perpendicular to each of the planar faces of the container 12 (only six contacts are shown in FIG. 8). When the container 12 is placed on one of its planar faces 17–28, one specific position-sensing contact, for example, contact 186 is within the air bubble 184. Since all of the position-sensing contacts except contact 186 are indicated as closed, the microprocessor (not shown) knows that contact 186 is in the "up" position, and the appropriate aural response is emitted.

Figure 9:
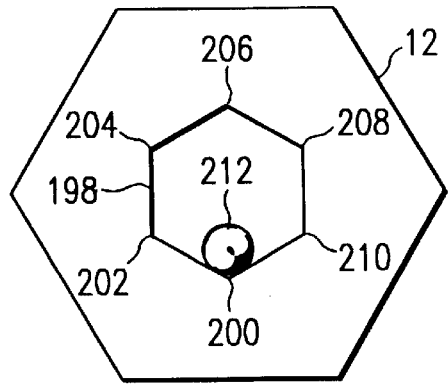

Referring to FIG. 9, an alternative to the sphere and liquid of FIG. 8 is shown in cross-section. An inner container 198 having a shape that matches the container 12 is formed therein. The inner container 198 is positioned to place a planar junction perpendicular to each of the planar surfaces 17–28 of container 12, forming receptacles 200, 202, 204, 206, 208 and 210 (the inner container 198 would have a total of twelve receptacles). A conductive ball 212 is free to move within the inner container 198. When the container 12 is positioned to place the conductive ball 212 in one of the receptacles 200–210, a signal is sent to the microprocessor (not shown) indicating a closed position. The microprocessor then knows that the planar surface directly opposite is in the "up" position, and the appropriate aural response is emitted. Alternatively, the inner container 198 could be a sphere with contacts perpendicular to the planar surfaces of container 12. When the conductive ball 212 is positioned in one of the appropriate receptacles, a closed position is indicated to the microprocessor; otherwise, an open position is indicated.

Figure 10A:
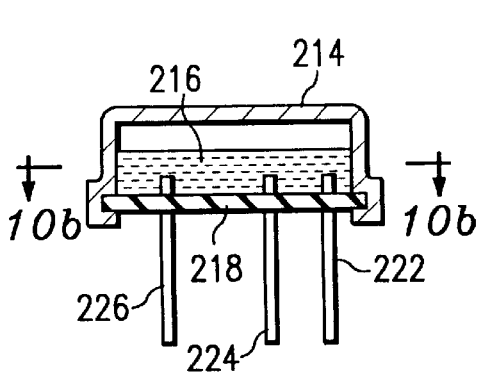
Figure 10B:
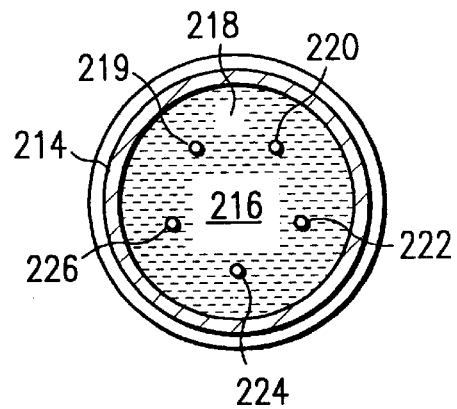

Referring to FIG. 10a, another alternative embodiment for the position-sensing mechanism 50 is illustrated in cross-sectional view. A conductive housing 214 is filled with a conductive liquid 216, such as, for example, sodium, potassium or mercury. A base 218 comprises an insulator such as glass. Metallic leads 219, 220, 222, 224 and 226 (FIG. 10b) extend through the base 218 and into the conductive liquid 216 on one side and onto an appropriate circuit on the PC board (not shown) on another side. As the toy 10 is turned onto various planar faces, various combinations of conductive leads 219–226 will be connected to the conductive housing 214 by the conductive liquid 216. In accordance with a code, the microprocessor will be able to determine which of the planar surfaces is in the "up" position, and the proper aural response will be emitted. Referring to FIG. 10b, the conductive housing 214 is shown to be circular in shape when viewed from a top plan view.

Figure 11:
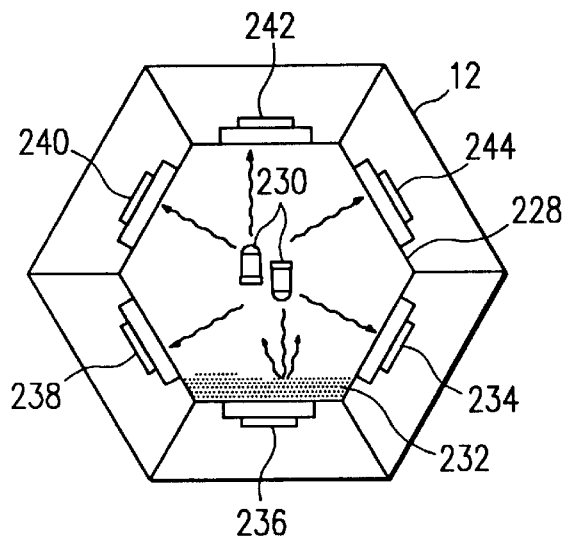

Referring to FIG. 11, another alternative embodiment of the position sensing mechanism of the present invention is illustrated in cross-sectional view. An inner container 228 has a shape that matches the container 12. The planar surfaces of the inner container 228 match with the planar surfaces 17–28 of the container 12. The container 228 is hollow and contains a light source 230, such as strobe lights. An opaque substance 232, such as sand or small metallic particles is free to move within the inner container 228. Directly opposite each planar surface of the inner container 228 and the container 12 are light receivers 234, 236, 238, 240, 242 and 244 (if container 12 is a dodecahedron, there will be twelve light receivers). As the container 12 is placed on one of the planar surfaces 17–28, the opaque substance 232 settles by gravity to the lowest point. The opaque substance will not permit light from the light source 230 to pass therethrough to the appropriate light receiver, such as, for example, light receiver 236. The microprocessor (not shown) interconnected via appropriate circuitry to the light receivers 234–244 is thus signalled that the planar surface opposite receiver 236 is in the "up" position, and the appropriate aural response is emitted.

Figure 12:
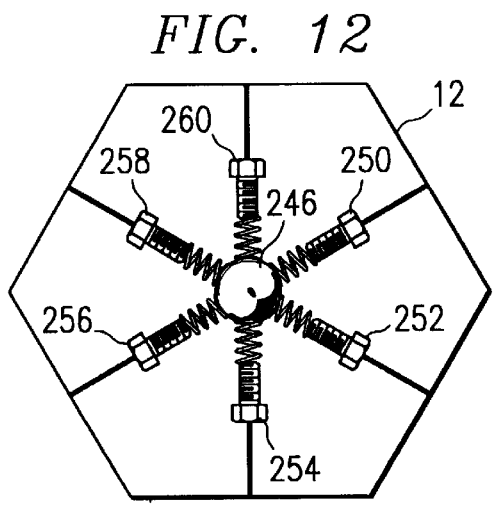

Referring to FIG. 12, a still further alternative embodiment of a position-sensing mechanism in accordance with the present invention is shown in cross-section. A conductive metallic ball 246 is positioned within the container 12. Rigidly suspended from the planar surfaces of the container 12 and perpendicular to each planar surface are sensors 250, 252, 254, 256, 258 and 260 (if the container 12 is a dodecahedron, there will be a total of twelve sensors). As the container 12 is placed on one of the planar surfaces 17–28, the conductive ball 246 is pulled by gravity towards one of the sensors, for example, sensor 254. A microprocessor (not shown) which is interconnected to the sensors 250–260 is then signaled via an appropriate code that the sensor 260 directly opposite sensor 254 is in the "up" position, and the appropriate aural response is emitted.

Figure 13:
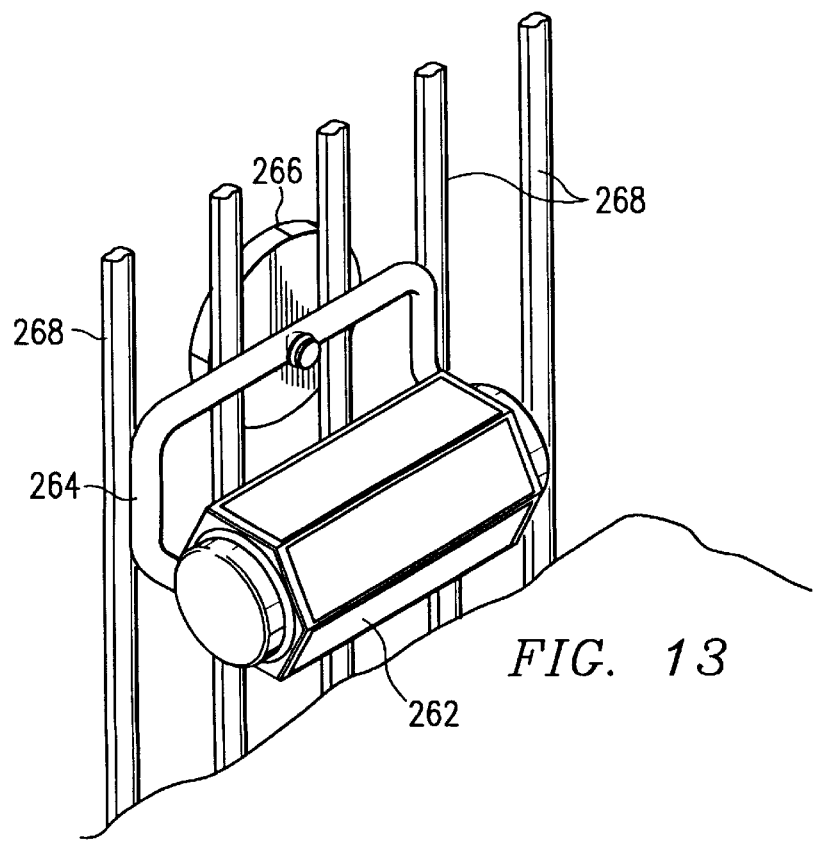
FIG. 13 is a perspective view of an alternative embodiment of the toy of the present invention.

Referring to FIG. 13, an alternative embodiment of the present invention is shown in perspective view. A six-sided regular prism 262 is fixed by a bracket 264, and an appropriate connection device 266 to the bars 268 of a cradle or crib. A child may turn the six-sided regular prism 262 into various positions, which would be detected by a position sensing mechanism and would result in an appropriate aural response being emitted therefrom. The six-sided regular prism 262 would be adaptable to be removed from the bars 268 and placed on the floor or placed into an appropriate pull-toy configuration, if desired.

The educational toy of the present invention is capable of adaptation to use by infants, as well as older children and adults. It is possible to provide the planar surfaces of the container with appropriate visual images for various age levels and to provide a microprocessor capable of emitting sound and/or voice responses thereto. With the addition of appropriate software, it would be possible to use the educational toy as a game piece, such as a talking die or a talking globe.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A didactic device comprising:

a power source;

a position sensing mechanism;

a sound-producing circuit responsive to said position sensing mechanism;

a speaker;

at least said sound-producing circuit and said speaker being electrically connected to said power source;

a container having an outer surface defined at least in part by a plurality of facet positions of respectively uniform size and configuration, each of said facet positions having a fixed unit visual display thereon different from the respective visual displays on the other facet positions at all times;

an initial placement of said container on a supporting surface locating only one of said plurality of facet positions in an "up" position in substantially parallel spaced relation to the supporting surface with only another one of said plurality of facet positions located in a "down" position in engagement with the supporting surface, any one of said plurality of facet positions on said container being locatable in the "up" position with a corresponding another one of said plurality of facet positions being locatable in the "down" position;

said container holding said power source, said position sensing mechanism, said sound-producing circuit and said speaker;

said position sensing mechanism being responsive to the initial placement of said container on the supporting surface with said another one of said plurality of facet positions in the "down" position in engagement with the supporting surface to signal said sound-producing circuit to produce a first aural response which provides educational information corresponding to the fixed unit visual display on said one facet position of said container located in the "up" position; and following the initial placement of said container on the supporting surface, said position sensing mechanism being further responsive to the subsequent placement of said container on the supporting surface locating a different one of said plurality of facet positions in the "up" position and a different another one of said plurality of facet positions located in the "down" position to signal said sound-producing circuit to produce a second aural response different from the first aural response and providing educational information corresponding to the fixed unit visual display on said different one of said plurality of facet positions of said container currently located in the "up" position.

2. A didactic device as set forth in claim 1, wherein said position sensing mechanism comprises:

a plurality of hollow slide tubes;

a plurality of sliding conductors, a respective one of said sliding conductors being located within each of said tubes; and a plurality of contacts, a respective one of said contacts corresponding to each of said tubes to indicate to said sound-producing circuit an open and a closed condition based upon the location of said conductor within said tube corresponding thereto by generating a signal to said sound-producing circuit when said conductor engages said contact.

3. A didactic device as set forth in claim 2, wherein each of said tubes is made of a conductive material.

4. A didactic device as set forth in claim 2, wherein each of conductors said sliding comprises a metal ball.

5. A didactic device as set forth in claim 2, wherein each of said sliding conductors comprises a conductive liquid.

6. A didactic device as set forth in claim 5, wherein said conductive liquid is a material taken from the group consisting of sodium, potassium and mercury.

7. A didactic device as set forth in claim 1, wherein said position sensing mechanism comprises:

a plurality of hollow slide tubes;

a plurality of opaque sliding weights, a respective one of said plurality of opaque sliding weights being disposed within each of said tubes;

a plurality of light transmitters; and a plurality of light receivers, each one of said light receivers being located opposite to a respective one of said light transmitters such that said light receivers indicate to said sound-producing circuit an open and a closed condition based upon a location of said opaque weight by generating a signal to said sound-producing circuit when light is received by a light receiver from the light transmitter corresponding thereto.

8. A didactic device as set forth in claim 1, wherein said position sensing mechanism comprises:

a plurality of hollow opaque slide tubes;

a plurality of reflective weights, a respective one of said reflective weights being located in each of said tubes; and a plurality of reflective optical switches, a respective one of said reflective optical switches being located in each of said tubes such that an indication is provided to said sound-producing circuit of an open and a closed condition of a respective reflective optical switch based upon a location of said reflective weight corresponding thereto.

9. A didactic device as set forth in claim 1, wherein said position sensing mechanism comprises:

a plurality of slide tracks;

a plurality of magnets, a respective one of said magnets being located within each of said tracks; and a plurality of magnetic sensors, a respective one of said magnetic sensors corresponding to each of said tracks to indicate to said sound-producing circuit an open and a closed condition based upon a location of the magnet corresponding thereto by generating a signal to said sound-producing circuit when the magnet is detected.

10. A didactic device as set forth in claim 1, wherein said position sensing mechanism comprises:

a hollow sphere within said container;

a conductive liquid partially filling said sphere; and a plurality of contacts within said sphere and respectively connected to said sound-producing circuit, a respective one of said contacts being located opposite to a respective one of each of said facet positions of said container such that a contact generates a signal to said sound-producing circuit when said contact is covered by said liquid.

11. A didactic device as set forth in claim 1, wherein said position sensing mechanism comprises:

an inner container matching the shape of said container; and a conductive weight located within said inner container such that said conductive weight contacts said inner container to generate a signal to said sound-producing circuit to indicate a location of said conductive weight.

12. A didactic device as set forth in claim 1, wherein said position sensing mechanism comprises:

a conductive housing;

a nonconductive base fixed to said conductive housing to form a vessel;

a conductive liquid partially filling said vessel; and a plurality of conductive leads extending through said base into said liquid such that an indication is provided to said sound-producing circuit as to an open and a closed condition of respective leads based upon the placement of said container on a supporting surface orienting a particular one of said plurality of facet positions on said container to be located in the "up" position.

13. A didactic device as set forth in claim 1, wherein said position sensing mechanism comprises:

an inner container matching the shape of said container;

a light source within said inner container;

a plurality of light detectors, a respective one of said light detectors fixed to said inner container and corresponding to each facet position of said container; and an opaque substance within said inner container such that said opaque substance will cover one of said light detectors based upon the placement of said container on a supporting surface to dispose the facet position corresponding to said one light detector in engagement with the supporting surface to provide an open condition to said sound-producing circuit.

14. A didactic device as set forth in claim 1, wherein said position sensing mechanism comprises:

a conductive ball positioned within said container;

a plurality of contacts, a respective one of said contacts being located in a position corresponding to each facet position of said container such that gravity causes said conductive ball to engage one of said contacts to generate a signal to said sound-producing circuit to indicate a position of said container in which the facet position on said container directly opposite from the facet position corresponding to the contact in engagement with the conductive ball is located in the "up" position.

15. A didactic device as set forth in claim 1, wherein said sound-producing circuit includes a microprocessor having a memory in which digital data representative of a plurality of different sounds respectively corresponding to the fixed unit visual display of each one of said plurality of facet positions on said container is stored; and said microprocessor being responsive to a signal from said position sensing mechanism to selectively access digital data representative of sounds from the memory thereof corresponding to the fixed unit visual display of the one facet position of said container located in the "up" position for playout.

16. A didactic device as set forth in claim 15, wherein the memory of said microprocessor includes digital data stored therein for effecting a turn-off of the device when accessed;

said microprocessor being responsive to inactivity of said position sensing mechanism over a predetermined time period to access said turn-off digital data from the memory thereof; and said sound-producing circuit being inactivated in response to the accessing and execution of said turn-off digital data by said microprocessor.

17. A didactic device as set forth in claim 15, wherein said position sensing mechanism comprises:

a plurality of reed switches; and a plurality of magnets respectively corresponding to said plurality of reed switches, each of said magnets being subject to movement in a direction activating the reed switch corresponding thereto in response to a specific placement of said container on a supporting surface orienting a particular one of said plurality of facet positions on said container to be located in the "up" position.

18. A didactic device as set forth in claim 17, wherein said position sensing mechanism further includes a plurality of slide tubes corresponding in number to said plurality of reed switches and said plurality of magnets, each of said slide tubes being disposed in registration with a respective reed switch and being mounted within said container so as to be perpendicular to one of said facet positions, said slide tubes being oriented with respect to each other such that adjacent slide tubes are arranged in equiangular relation; and each of said plurality of magnets being mounted in a respective slide tube and being movable to selectively activate said reed switch corresponding thereto based upon the placement of said container on the supporting surface in a specific orientation in which a particular one of said plurality of facet positions on said container is located in the "up" position.

19. A didactic device as set forth in claim 18, wherein said plurality of reed switches and said plurality of magnets are fewer in number than said plurality of facet positions on said container; and each of said magnets being potentially responsive to the placement of said container on the supporting surface so as to orient any one of said plurality of facet positions on said container in the "up" position to move in a direction activating the reed switch corresponding thereto so as to provide at least a number of combinations of activated reed switches equal to the number of facet positions on said container for generating a coded signal representative of the activated reed switches corresponding to the facet position on said container in the "up" position to said microprocessor.

20. A didactic device as set forth in claim 1, wherein said container is a dodecahedron having an outer surface defined by twelve facet positions.

21. A didactic device as set forth in claim 1, wherein said container is a regular prism having an outer surface defined by six facet positions.

22. A didactic device as set forth in claim 1, wherein said position sensing mechanism comprises:

a plurality of reed switches; and a plurality of magnets respectively corresponding to said plurality of reed switches, each of said magnets being subject to movement in a direction activating the reed switch corresponding thereto in response to a specific placement of said container on a supporting surface orienting a particular one of said plurality of facet positions on said container to be located in the "up" position.

23. A didactic device as set forth in claim 22, wherein said position sensing mechanism further includes a plurality of slide tubes corresponding in number to said plurality of reed switches and said plurality of magnets, each of said slide tubes being disposed in registration with a respective reed switch and being mounted within said container so as to be perpendicular to one of said facet positions, said slide tubes being oriented with respect to each other such that adjacent slide tubes are arranged in equiangular relation; and each of said plurality of magnets being mounted in a respective slide tube and being movable to selectively activate said reed switch corresponding thereto based upon the placement of said container on the supporting surface in a specific orientation in which a particular one of said plurality of facet positions on said container is located in the "up" position.

24. A didactic device comprising:

a dodecahedron housing having an outer surface defined by twelve flat facet positions of respectively uniform size and configuration, each of said facet positions having a fixed unit visual display thereon different from the respective visual displays on the other facet positions at all times;

said housing being disposable on a supporting surface in an initial placement of said housing such that only one of said twelve facet positions is located in an "up" position in substantially parallel spaced relation to the supporting surface with only another one of said twelve facet positions on said housing located in a "down" position in engagement with the supporting surface, any one of said twelve facet positions on said housing being locatable in the "up" position with a corresponding another one of said twelve facet positions being locatable in the "down" position;

a position sensing mechanism located within said housing and providing an indication as to which one of said twelve facet positions on said housing is in the "up" position;

sound-producing means located within said housing and including a microprocessor responsive to the indication from said position sensing mechanism for generating an aural response representative of the visual display on said one facet position located in the "up" position;

a speaker located within said housing and operably connected to said microprocessor for transmitting said aural response; and a power supply located within said housing for providing electrical energy at least to said microprocessor and said speaker;

said position sensing mechanism being responsive to the initial placement of said housing on the supporting surface with said another one of said twelve facet positions in the "down" position in engagement with the supporting surface to signal said sound-producing means to produce a first aural response representative of the fixed unit visual display on said one facet position of said housing located in the "up" position; and following the initial placement of said housing on the supporting surface, said position sensing mechanism being further responsive to the subsequent placement of said housing on the supporting surface locating a different one of said twelve facet positions in the "up" position and a different another one of said twelve facet positions located in the "down" position to signal said sound-producing means to generate a second aural response different from the first aural response and corresponding to the fixed unit visual display on said different one of said twelve facet positions of said housing currently located in the "up" position.

25. A didactic device as set forth in claim 24, wherein said position sensing mechanism comprises:
   a plurality of hollow slide tubes, each slide tube being positioned perpendicular to one of said facet positions of said dodecahedron housing;
   a plurality of conductors, a respective one of said conductors being slidably received within each of said tubes; and
   a plurality of contacts, a respective one of said contacts corresponding to each of said tubes to indicate to said microprocessor an open and a closed condition based upon the location of said conductor within said tube corresponding thereto by generating a signal to said microprocessor when said conductor engages said contact.

26. A didactic device as set forth in claim 25, wherein each of said tubes is made of a conductive material.

27. A didactic device as set forth in claim 25, wherein each of said sliding conductors comprises a metal ball.

28. A didactic device as set forth in claim 25, wherein each of said sliding conductors comprises a conductive liquid.

29. A didactic device as set forth in claim 25, wherein said plurality of hollow slide tubes comprises five in number.

30. A didactice device as set forth in claim 24, wherein said position sensing mechanism comprises:
   a plurality of hollow slide tubes;
   a plurality of opaque sliding weights, a respective one of said plurality of opaque sliding weights being disposed within each of said tubes;
   a plurality of light transmitters proximate each of said tubes; and
   a plurality of light receivers, each one of said light receivers being located opposite to a respective one of said light transmitters, such that said light receivers indicate to said microprocessor an open and a closed condition based upon a location of said opaque weight by generating a signal to said microprocessor when light is received by a light receiver from the light transmitter corresponding thereto.

31. A didactic device as set forth in claim 24, wherein said position sensing mechanism comprises:
   a plurality of hollow opaque slide tubes;
   a plurality of reflective weights, a respective one of said reflective weights being located in each of said tubes; and
   a plurality of reflective optical switches, a respective one of said reflective optical switches proximate to each of said tubes such that an indication is provided to said microprocessor of an open and a closed condition of a respective reflective optical switch based upon a location of said reflective weight corresponding thereto.

32. A didactic device as set forth in claim 24, wherein said position sensing mechanism comprises:
   a plurality of slide tracks;
   a plurality of magnets, a respective one of said magnets being slidably received within each of said tracks; and
   a plurality of magnetic sensors, a respective one of said magnetic sensors proximate to each of said tracks to indicate to said microprocessor an open and a closed condition based upon a location of the magnet corresponding thereto by generating a signal to said microprocessor when the magnet is detected.

33. A didactic device device as set forth in claim 24, wherein said position sensing mechanism comprises:
   a hollow sphere within said dodecahedron housing;
   a conductive liquid partially filling said hollow sphere; and
   a plurality of contacts within said sphere and respectively connected to said microprocessor, a respective one of said contacts being located opposite to a respective one of each of said facet positions of said dodecahedron housing such that a contact generates a signal to said microprocessor when said contact is covered by said liquid.

34. A didactic device as set forth in claim 24, wherein said position sensing mechanism comprises:
   an inner container matching the shape of said dodecahedron housing; and
   a conductive weight located within said inner container, such that said conductive weight contacts said inner container to generate a signal to said microprocessor to indicate a location of said conductive weight.

35. A didactic device as set forth in claim 24, wherein said position sensing mechanism comprises:
- a conductive housing;
- a nonconductive base fixed to said conductive housing to form a vessel;
- a conductive liquid partially filling said vessel; and
- a plurality of conductive leads extending through said base into said liquid such that an indication is provided to said microprocessor as to an open and a closed condition of respective leads based upon the placement of said dodecahedron housing on a supporting surface orienting a particular one of said twelve facet positions on said dodecahedron housing to be located in the "up" position.

36. A didactic device as set forth in claim 24, wherein said position sensing mechanism comprises:
- an inner container matching the shape of said dodecahedron housing;
- a light source within said inner container;
- a plurality of light detectors, a respective one of said light detectors fixed to said inner container and corresponding to each facet position of said dodecahedron housing; and
- an opaque substance within said inner container such that said opaque substance will cover one of said light detectors based upon the placement of said dodecahedron housing on a supporting surface to dispose the facet position corresponding to said one light detector in engagement with the supporting surface to provide an open condition to said microprocessor.

37. A didactic device as set forth in claim 24, therein said position sensing mechanism comprises:
- a conductive ball positioned within said dodecahedron housing; and
- a plurality of contacts, a respective one of said contacts being located in a position corresponding to each facet position of said dodecahedron housing such that gravity causes said conductive ball to engage one of said contacts to generate a signal to said microprocessor to indicate a position of said dodecahedron housing in which the facet position on said dodecahedron housing directly opposite from the facet position corresponding to the contact in engagement with the conductive ball is located in the "up" position.

38. A didactic device as set forth in claim 24, wherein microprocessor has a memory in which digital data is stored for effecting a turn-off of the device when accessed;
said microprocessor being responsive to inactivity of said position sensing mechanism over a predetermined time period to access said turn-off digital data from the memory thereof; and
said sound-producing means being inactivated in response to the accessing and execution of said turn-off digital data by said microprocessor.

39. A didactic device as set forth in claim 24, wherein said position sensing mechanism comprises:
- a plurality of reed switches; and
- a plurality of magnets respectively corresponding to said plurality of reed switches, each of said magnets being subject to movement in a direction activating the reed switch corresponding thereto in response to a specific placement of said housing on a supporting surface orienting a particular one of said twelve of facet positions on said housing to be located in the "up" position.

40. A didactic device as set forth in claim 39, further including a plurality of slide tubes corresponding in number to said plurality of reed switches and said plurality of magnets, each of said slide tubes being disposed in registration with a respective reed switch and being mounted within said housing so as to be perpendicular to one of said facet positions, said slide tubes being oriented with respect to each other such that adjacent slide tubes are arranged in equiangular relation; and
each of said plurality of magnets being mounted in a respective slide tube and being movable to selectively activate said reed switch corresponding thereto based upon the placement of said housing on the supporting surface in a specific orientation in which a particular one of said twelve facet positions on said housing is located in the "up" position.

41. A didactic device as set forth in claim 40, wherein said plurality of reed switches and said plurality of magnets are fewer in number than said twelve facet positions on said housing; and
each of said magnets being potentially responsive to the placement of said housing on the supporting surface so as to orient any one of said twelve facet positions on said housing in the "up" position to move in a direction activating the reed switch corresponding thereto so as to provide at least a number of combinations of activated reed switches equal to the number of facet positions on said housing for generating a coded signal representative of the activated reed switches corresponding to the facet position on said housing in the "up" position to said microprocessor.

42. A didactic device as set forth in claim 41, wherein said plurality of reed switches, said plurality of magnets, and said plurality of slide tubes are each five in number.

* * * * *